United States Patent

Reiffer

[11] Patent Number: 6,042,163
[45] Date of Patent: Mar. 28, 2000

[54] VEHICLE BUMPER INCLUDING END SECTION AND METHOD OF MANUFACTURE

[75] Inventor: Raymond C. Reiffer, Zeeland, Mich.

[73] Assignee: Shape Corporation, Grand Haven, Mich.

[21] Appl. No.: 09/014,745

[22] Filed: Jan. 28, 1998

[51] Int. Cl.[7] .................................................. B60R 19/04
[52] U.S. Cl. ...................... 293/155; 293/154; 293/102; 293/151
[58] Field of Search ..................... 293/102, 154, 293/122, 155, 120, 121, 149, 151, 152, 153, 126

[56] References Cited

U.S. PATENT DOCUMENTS

| | | |
|---|---|---|
| 1,300,433 | 4/1919 | McGregor . |
| 1,585,974 | 5/1926 | Girl . |
| 1,632,563 | 6/1927 | Sager . |
| 1,679,823 | 8/1928 | Harris . |
| 3,877,741 | 4/1975 | Wilfert et al. . |
| 4,328,986 | 5/1982 | Weller et al. . |
| 4,422,680 | 12/1983 | Goupy . |
| 4,440,429 | 4/1984 | Eyb . |
| 4,563,028 | 1/1986 | Ogawa et al. . |
| 4,626,011 | 12/1986 | Gauthier . |
| 4,783,104 | 11/1988 | Watanabe et al. . |
| 5,031,947 | 7/1991 | Chen . |
| 5,080,411 | 1/1992 | Stewart et al. . |
| 5,080,412 | 1/1992 | Stewart et al. . |
| 5,219,197 | 6/1993 | Rich et al. . |
| 5,306,058 | 4/1994 | Sturrus et al. . |
| 5,425,561 | 6/1995 | Morgan . |
| 5,441,319 | 8/1995 | Oyama et al. . |
| 5,462,325 | 10/1995 | Masuda et al. . |
| 5,566,874 | 10/1996 | Sturrus . |
| 5,584,518 | 12/1996 | Frank et al. . |
| 5,603,541 | 2/1997 | Wada et al. . |
| 5,803,517 | 9/1998 | Shibuya . |

FOREIGN PATENT DOCUMENTS 1237453  3/1967  Germany .

OTHER PUBLICATIONS

Exhibit A discloses a prior art bumper manufactured by Shape Corporation that includes a prewelded multi–piece bracket attached to an end of a tubular bumper.

*Primary Examiner*—Joseph D. Pape
*Attorney, Agent, or Firm*—Price Heneveld Cooper Dewitt & Litton

[57] ABSTRACT

A vehicle bumper bar includes a swept B-shaped beam section and one-piece end pieces attached to opposing ends of the beam section for forming a compound angle along a front of the bumper bar. The end pieces are tubular and include circumferentially overlapping flanges that allow the shape of the end piece to be circumferentially adjusted to a best-fit condition on the ends of the beam section, and further include attachment tabs that longitudinally engage the ends of the beam section. The attachment tabs extend from the end piece longitudinally and circumferentially onto the beam section, in order to provide optimal impact and attachment strength of the end piece on the beam section. A method includes positioning the end piece on an end of the beam section, clamping the end piece onto the end including shaping the end piece circumferentially to a best-fit shape, and securing the end piece to the beam section by welding.

19 Claims, 6 Drawing Sheets

VEHICLE BUMPER INCLUDING END SECTION AND METHOD OF MANUFACTURE

BACKGROUND

The present invention concerns vehicle bumper bars, and more particularly concerns a tubular bumper beam section with end pieces attached to each of the opposing ends for optimal fit and appearance.

Modern vehicles often include a highly stylized and aerodynamic front end design. In an effort to achieve this appearance, bumper reinforcement beams have been incorporated into such designs that include curved center sections and angled end sections that provide an increased angle at the outer front (or rear) corners of the vehicle. This results in a more rounded aerodynamic appearance at the front corners. However, it is desirable to achieve this aerodynamic appearance without sacrificing bumper strength, dimensional accuracy, or cost. It is known to manufacture swept rollformed tubular bumpers, such as disclosed in U.S. Pat. Nos. 5,566,874 and 5,306,058. These bumpers exhibit excellent strength properties and can be manufactured at a very competitive cost, but the front surfaces on their end sections are not provided with an increased/compound angle.

A multi-piece bracket can be welded or attached to an end of a rollformed swept tubular bumper. However, multi-piece brackets are more costly than desired due to their multiple pieces that must be stamped and then secured together, and then secured to the swept tubular bumper. Any variation in the swept tubular bumper or the multi-piece bracket results in poor fit and assembly difficulties. If the multi-piece bracket is secured by welding, substantially any poor weld will result in problems, since it may affect compliance with the federal bumper test requirements, such as the front corner impact tests.

Accordingly, there is a need for a bumper bar and method of manufacture solving the aforementioned problems.

SUMMARY OF INVENTION

In one aspect of the present invention, a vehicle bumper bar includes a beam section made from high strength material. The beam section includes opposing ends, and end pieces attached to each of the opposing ends. Each end piece includes a body defining a tubular shape configured to mate with the opposing ends, and also includes overlapping flanges constructed for circumferential adjustment so that the tubular shape can be adjusted to a best-fit cross-sectional shape by adjusting the overlap of the overlapping flanges before the overlapping flanges are secured to the beam section. Each end piece still further includes attachment tabs longitudinally engaging the beam section and secured thereto, whereby the end pieces are adjustable circumferentially and longitudinally to better fit the opposing ends of the beam section.

In another aspect of the present invention, a vehicle bumper bar includes a beam section made from high strength material. The beam section includes opposing ends, and further includes top, bottom, front, and rear walls forming at least one rigid tube. End pieces are attached to each of the opposing ends. Each of the end pieces include top, bottom, front, and rear wall sections and also include tabs extending from the top, bottom, front, and rear wall sections. The tabs on one of the front and rear wall sections include circumferentially extending tabs that engage and are fixed to at least one of the top and bottom walls on the beam section.

In yet another aspect of the present invention, a method includes steps of providing a beam section constructed for use in a vehicle bumper, and providing an end piece having a circumferentially adjustable cross section and tabs constructed to longitudinally engage an end of the beam section. The method further includes positioning the end piece on the beam section with the tabs engaging the end of the beam section, adjusting a shape of the cross section on the end of the beam section to best fit the end, and securing the end piece onto the end in a desired longitudinal position with a best-fit shape.

These and other features and advantages of the present invention will be further understood and appreciated by those skilled in the art by reference to the following specification, claims, and appended drawings.

DETAILED DESCRIPTION OF FIGURES

DETAILED DESCRIPTION OF PREFERRED EMBODIMENTS

Figure 1:
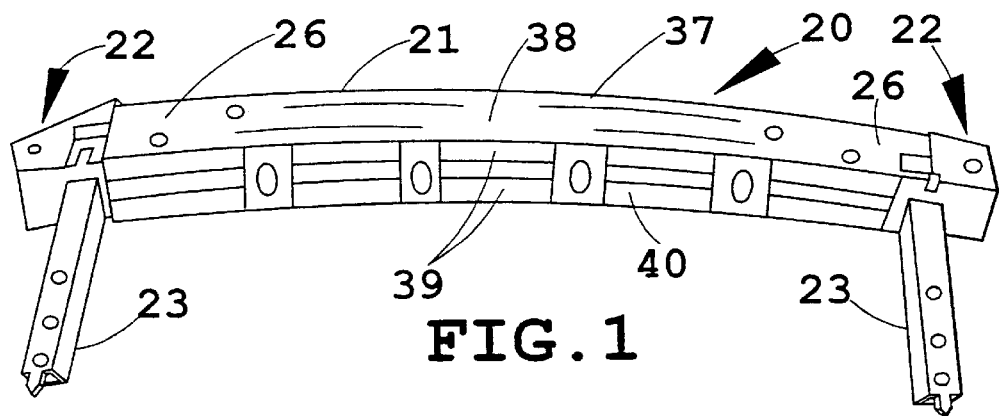
FIG. 1 is a perspective view of a bumper bar embodying the present invention.

For purposes of description herein, the terms "upper," "lower," "right," "left," "rear," "front," "vertical," "horizontal," and derivatives thereof shall relate to the invention as oriented with the bumper in a vehicle-assembled position (see FIG. 1) and with the fixture facing an operator/worker. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as unnecessarily limiting, unless the claims expressly state otherwise.

A vehicle bumper bar 20 (FIG. 1) embodying the present invention includes a swept B-shaped beam section 21, and one-piece end pieces 22 attached to opposing ends 26 of the beam section 21. The end pieces 22 form an increased compound angle along a front end surface of the bumper bar 20 at the vehicle's front (or rear) corners for providing an aerodynamic look to a vehicle incorporating the bumper bar 20. Stays 23 are welded to and extend from the end pieces 22 for attachment to the vehicle. The end pieces 22 are tubular and include circumferentially overlapping flanges 24 and 25 (FIG. 3) that allow the shape of the end piece 22 to be circumferentially adjusted to a best-fit condition on the ends 26 (FIG. 1) of the beam section 21, and further include attachment tabs or flanges 27–32 (FIG. 3) that provide attachment to the ends 26 of the beam section 21 in a manner that provides optimal impact and attachment strength of the end piece 22 on the beam section 21. It is noted that the word "circumferentially" is used herein to mean a perimeter direction and is not intended to mean only a circular shape.

Figure 2:
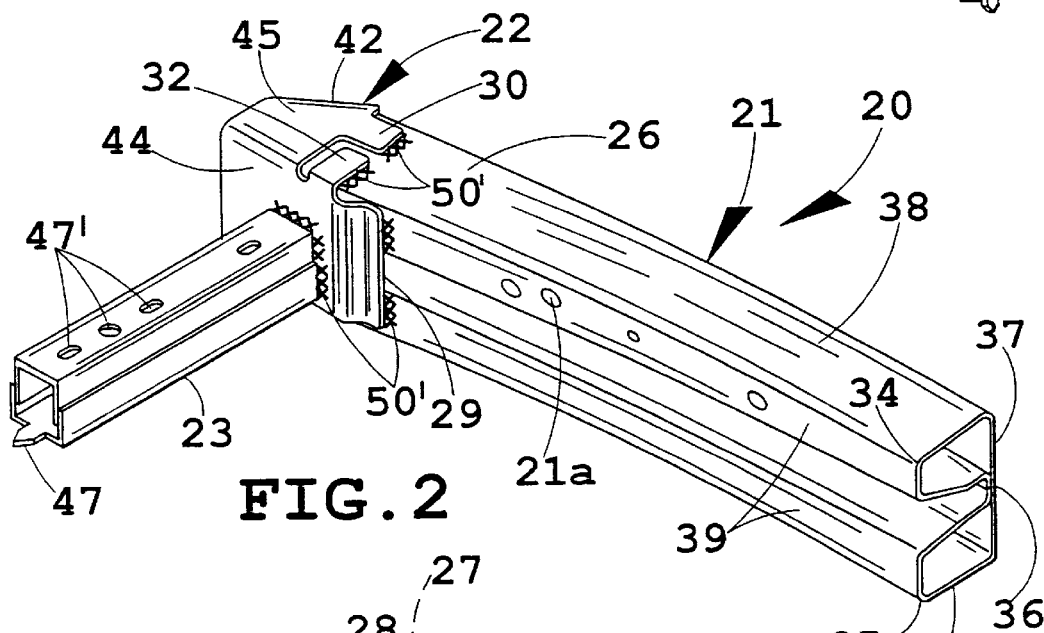
FIG. 2 is an enlarged fragmentary perspective view of the bumper bar shown in FIG. 1.

It is contemplated that the end pieces 22 can be utilized on a variety of different beam sections, not all of which beam sections are tubular. Nonetheless, the bumper bar 20 which utilizes a B-shaped beam section 21 (FIG. 2) and end piece 22 is a particularly advantageous arrangement due to its high strength and competitive cost. Beam section 21 (FIG. 2) includes a pair of tube sections 34 and 35 connected by an intermediate section 36. The numbers 37–40 identify the front, top, rear, and bottom surfaces of the beam section 21. Notably, the rear surface 39 includes spaced apart areas on each of the tube sections 34 and 35. The tube sections 34 and 35 include locating holes 21A so that the beam section 21 can be accurately located on the fixture 64, as described below.

Figure 3:
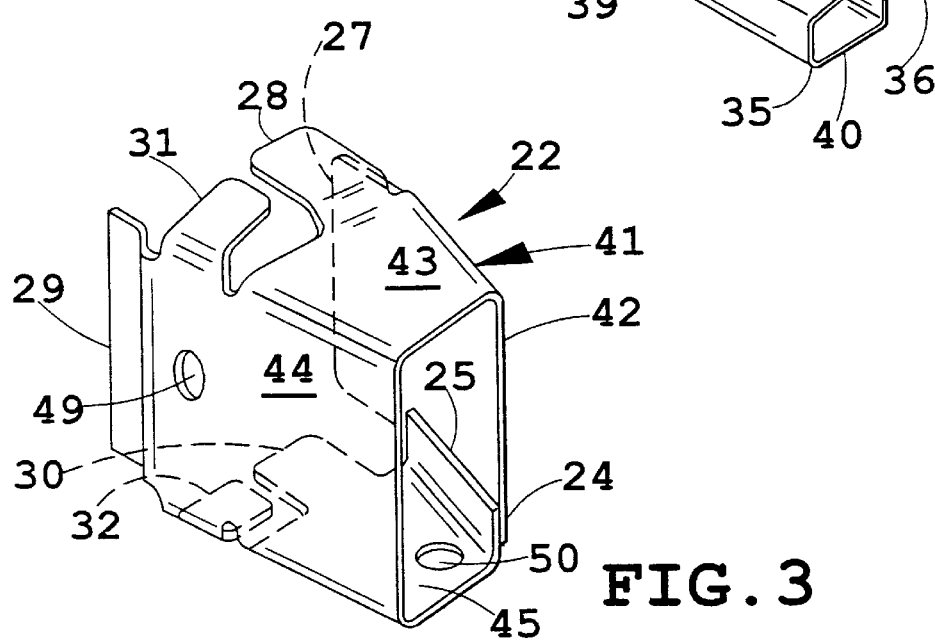
FIG. 3 is a perspective view of the end piece shown in FIG. 2.
Figure 4:
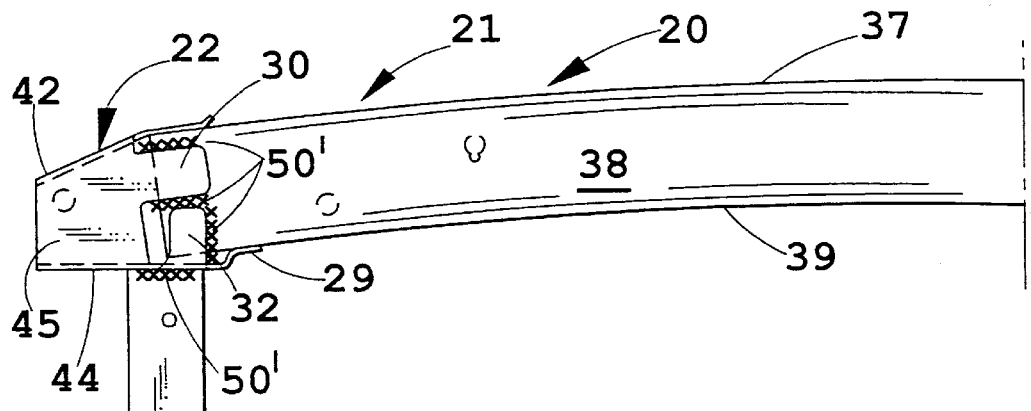
FIGS. 4–6 are top, front, and rear fragmentary views of the bumper shown in FIG. 2.
Figure 5:
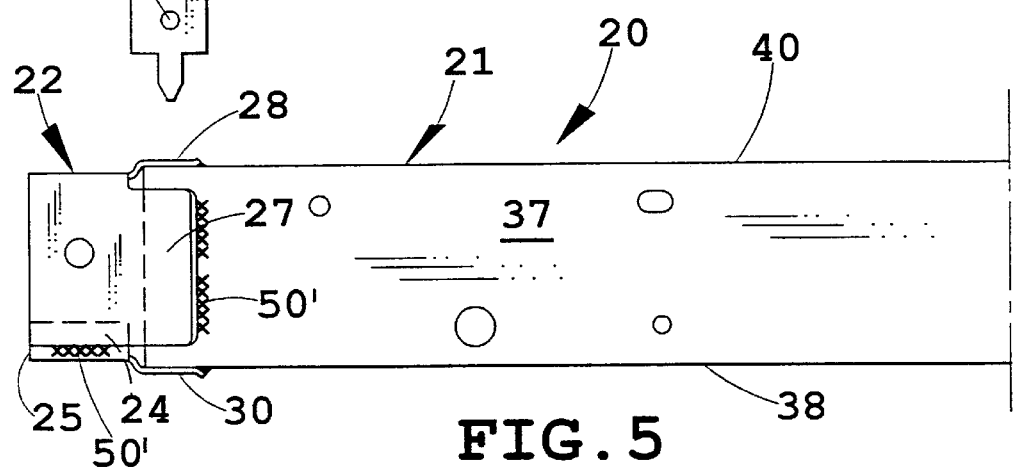
Figure 6:
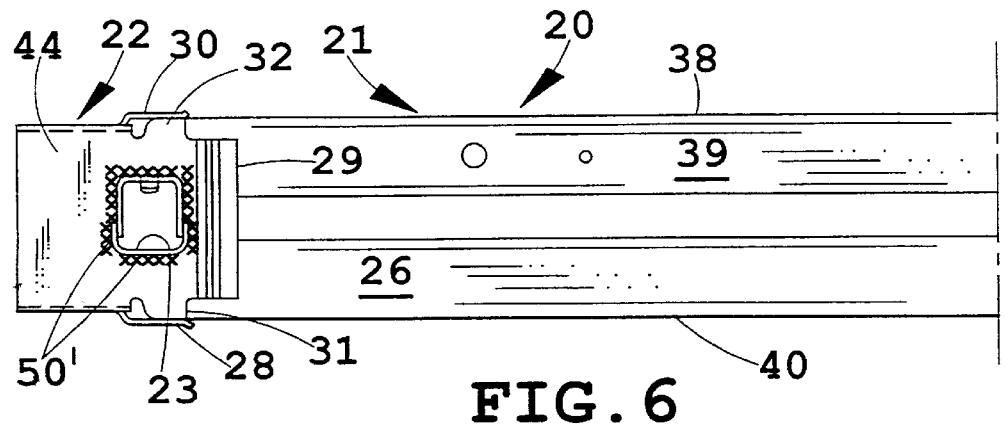

End piece 22 (FIG. 3) includes a body 41 defining a tubular shape configured to mate with the opposing ends 26 of the beam section 21. The body 41 includes front, top, rear, and bottom wall sections 42–45. The circumferentially extending overlapping flanges 24 and 25 extend from front wall 42 and bottom wall 45, respectively, both overlapping flanges 24 and 25 being located on a front of the end piece 22 but being located near the joinder of walls 42 and 45. When the end piece 22 is attached to an end of beam section 21 (FIG. 2), the front wall section 42 angles rearwardly at an increased angle from the end/front surface 37 of the beam section 21. Also, the rear wall section 44 extends generally sideways and perpendicular to the fore/aft direction of the vehicle, while the stays 23 extend parallel the fore/aft direction of the vehicle. As seen in FIG. 3, this is accomplished by the front and rear wall sections 42 and 44 extending at an angle to each other. Attachment tabs 27–30 extend from the front, top, rear, and bottom wall sections 42–45, respectively, and are configured to mateably longitudinally engage and be welded to the front, top, rear, and bottom surfaces 37–40 of beam section 21. Tab 31 extends from rear wall section 44 circumferentially to a location adjacent tab 43, and attachment tab 32 extends circumferentially from rear wall section 44 to a location adjacent tab 30. Tabs 27–32 are flared outwardly to define a slightly opened chute for receiving the opposing ends 26 of beam section 21 to facilitate assembly. The attachment tabs 31 and 32 are mateably engaged and are welded to top and bottom surfaces 38 and 40. This arrangement of tabs 31 and 32 and also tabs 27–30 provides optimal strength and impact resistance when the end pieces 22 are welded to beam section 21. Stay 23 (FIG. 2) is welded to the rear wall section 44. Stay 23 includes locating structure 47 and attachment structure 47' (FIG. 2) to facilitate attachment to the vehicle. Locating holes 49 and 50 (FIG. 3) are located at least on rear and bottom wall sections 44 and 45. It is contemplated that more locating holes or different locating structures can be used and still be within the scope of the present invention. The overlapping flanges 24 and 25 and also the attachment tabs 27–32 are welded to the opposing ends 26 of beam section 21 along the ends and side edges of the tabs 27–32 for optimal strength (see weld locations 50' on FIGS. 2 and 4–6).

Optionally, each of the end pieces 22 comprise a one-piece progressively stamped part that minimizes dimensional variation and pre-assembly secondary operations. The attachment tabs 27–32 define an open end slightly flared outwardly and shaped to telescopingly longitudinally engage the opposing ends 26 of the beam section 21 to facilitate automated mating and welding.

Figure 7:
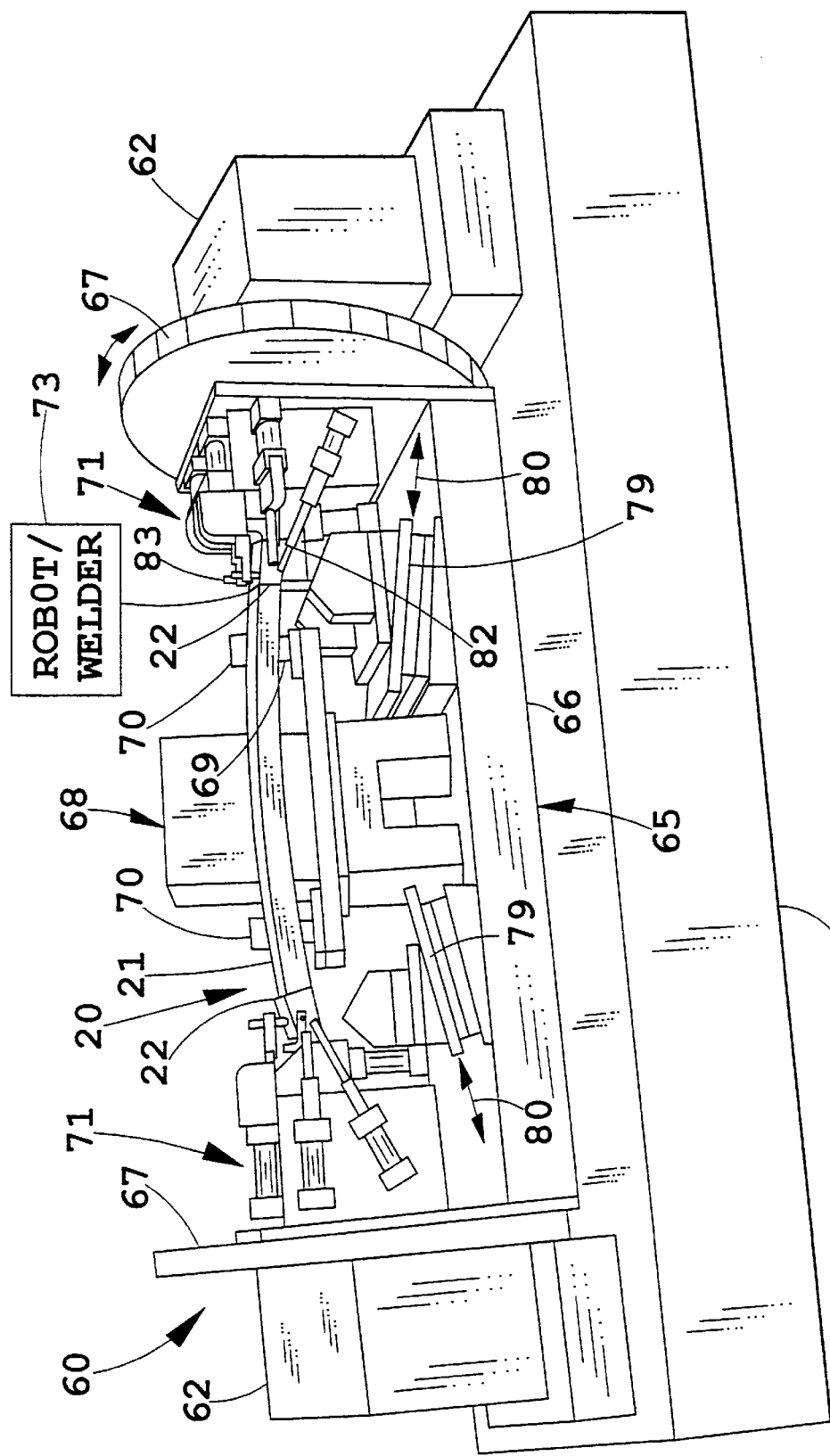
FIG. 7 is a perspective view of a fixture for holding and then welding the end pieces of FIG. 3 onto the tubular bumper of FIG. 2, the fixture being shown as holding end pieces on the bumper.

Fixture apparatus 60 (FIG. 7) includes a bed 61 and opposing end stands 62. The bumper holding fixture 64 includes a rotatable subframe 65 with a longitudinal section 66 and end plates 67 that rotatably engage end stands 62. An intermediate stand 68 supports locators 69 for accurately locating the beam section 21 on the holding fixture 64. Clamps 70 releasably retain the beam section 21 in place on the holding fixture 64.

Figure 8:
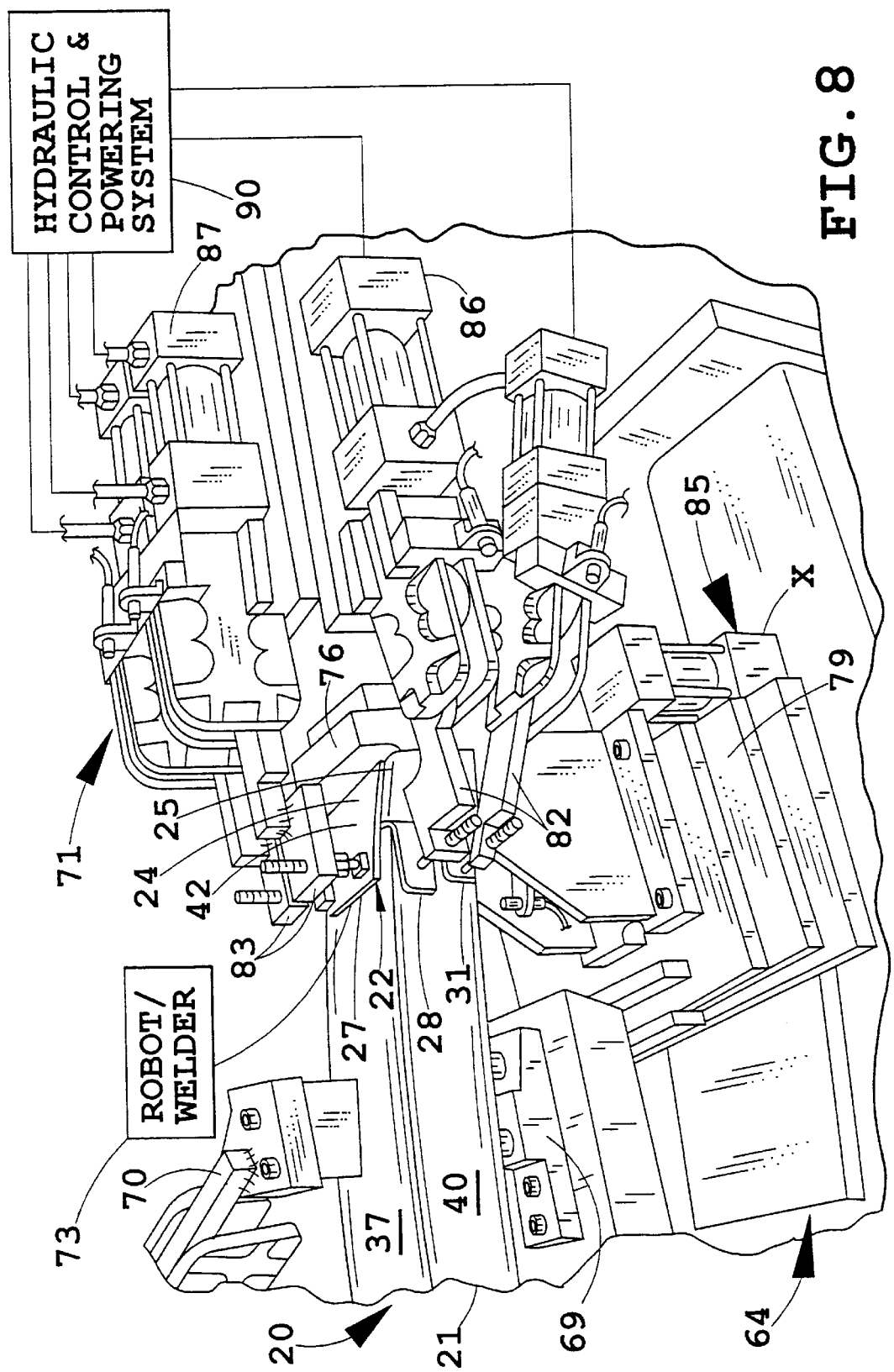
FIG. 8 is an enlarged view of a right end of the fixture shown in FIG. 7.
Figure 9:
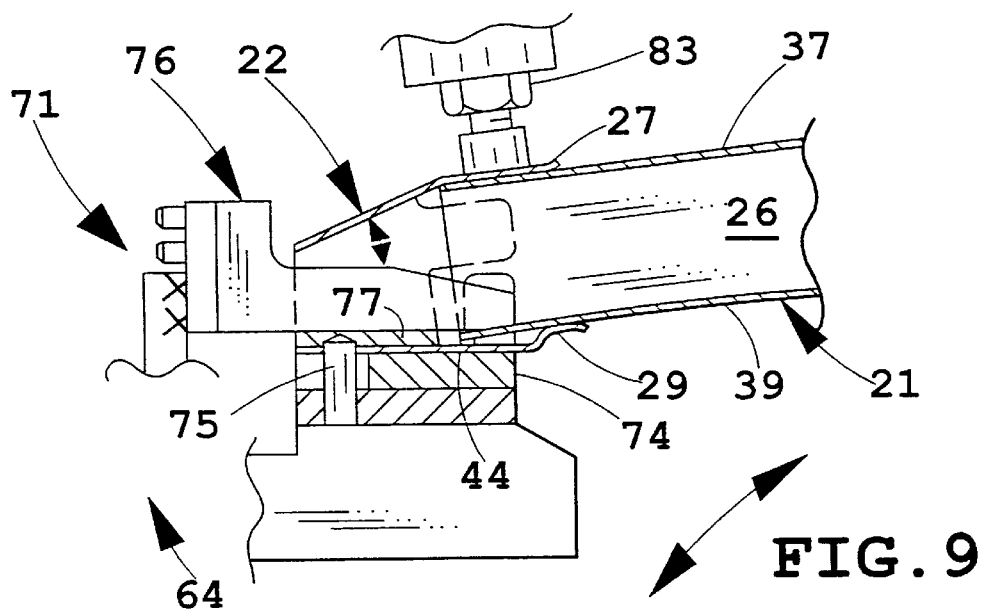
FIG. 9 is a fragmentary front view of the locating and clamping arrangement shown in FIG. 8 for holding the end piece on the tubular bumper section.
Figure 10:
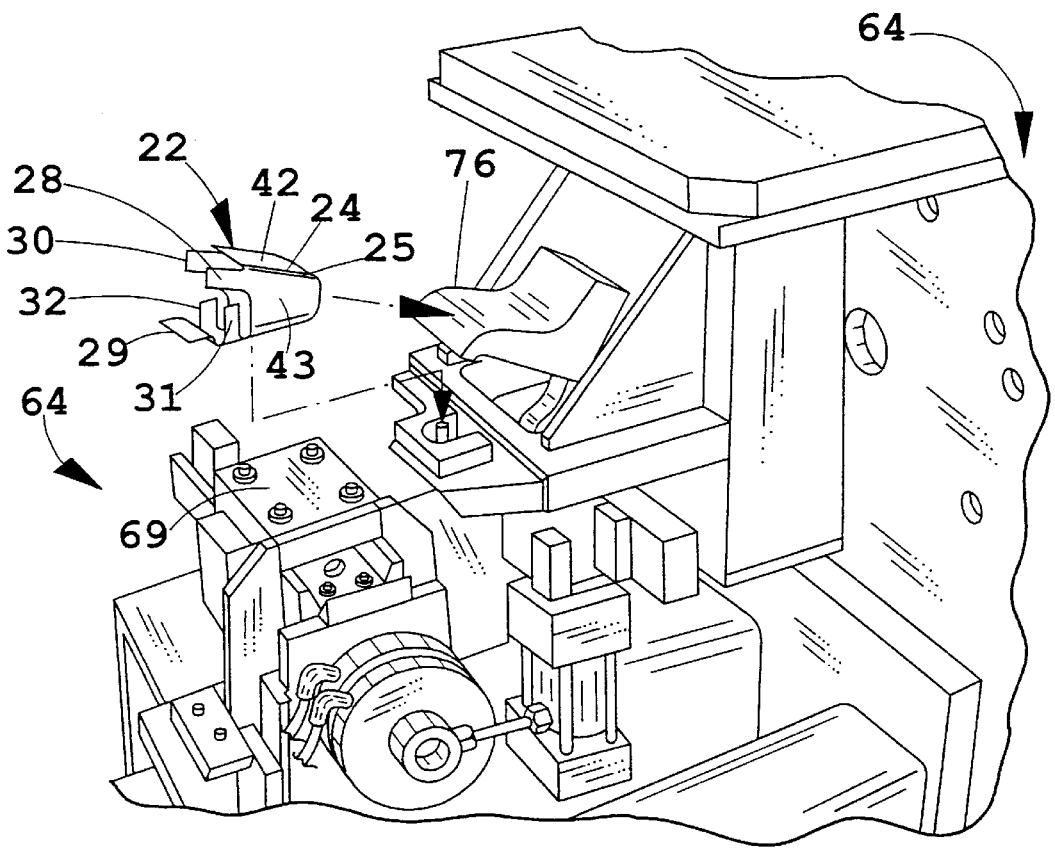
FIG. 10 is a perspective view of the fixture of FIG. 8 showing placement of the end piece into the fixture.
Figure 11:
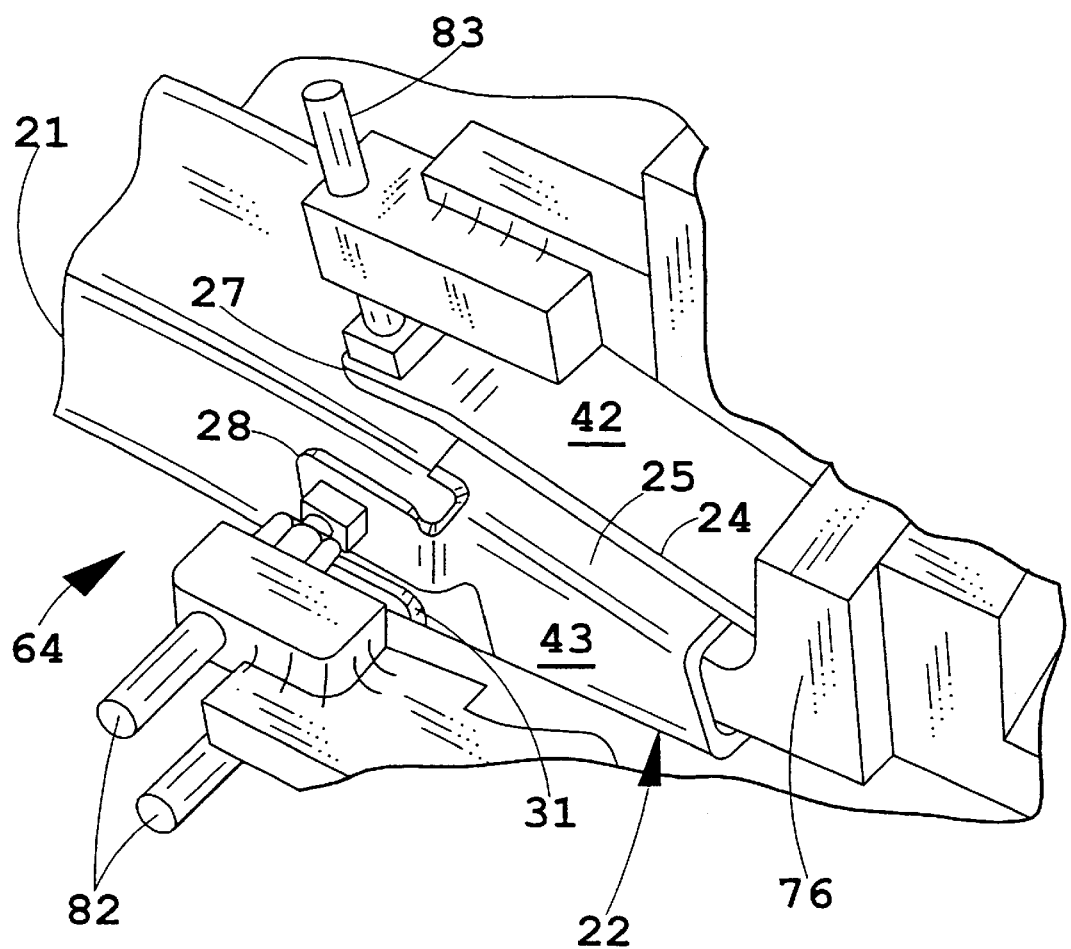
FIG. 11 is a perspective view of the fixture of FIG. 8 showing the end piece clamped in position on the fixture.

The bumper holding fixture 64 includes a holding and clamping mechanism 71 shaped to securely grasp end pieces 22, move them into position on the ends 26 of the beam section 21, clamp the end pieces 22 onto the beam section 21, and permit welding thereon by the welder 73 (FIG. 8). The holding and clamping mechanism 71 includes a pad 74 (FIG. 9) shaped to receive and accurately support the rear wall section 44 of the end piece 22. A locator pin 75 on the pad 74 engages the locating hole on the rear wall section 44. A clamping arm 76 fits within the tubular end piece 22 and includes a pad 77 for clamping the rear wall section 44 against the lower pad 74 with locator pin 75 accurately positioning the end piece 22. The holding and clamping mechanism 71 is mounted on a movable carrier 79 (FIG. 7) adapted to translate along a direction 80 on holding fixture 64. The direction 80 is aligned parallel with the longitudinal axis of ends 26 of the beam section 21, such that by moving the carrier 29 inwardly, the end pieces 22 are telescoped into engagement with the ends 26 of the beam section 21. After the clamping arm 76 has clamped the end piece 22 in place (FIG. 9) and after the carrier 79 has moved the end piece onto an end of the beam section 21 (FIG. 7), side clamps 82 (FIG. 8) are actuated to clamp the top and bottom attachment tabs 28 (and 30) and also to clamp the circumferentially extending attachment tabs 31 (and 32) onto the end 26 of the beam section 21. During activation of side clamps 82, the overlapping flanges 24 and 25 slide with respect to each other so that the tubular shape of the end piece 22 changes to a best-fit condition and conforms to the opposing end 26 of the beam section 21. Side clamps 82 also cause the tabs 28–30 to closely engage the outer surfaces of the beam section 21. Thereafter, a third clamp 83 clamps the attachment tab 27 onto a front of the opposing end 26 of the beam section 21. Third clamp 83 also biases the circumferential flange 24 into close engagement with its mating overlapping flange 25. The movements of clamping arm 76 and clamps 82 and 83 are driven by actuators 85–87, respectively. The illustrated actuators 85–87 are hydraulic actuators driven by a hydraulic control and powering system 90; however, it is contemplated that any number of different actuating systems can be utilized.

In operation, beam section 21 is placed in the fixture and clamped in place on locators on the intermediate structure 68 of fixture 64. End pieces 22 are set on locator pins 75 on lower pad 74, and clamped in place by clamping arm 76. The fixture 64 is actuated so that the carrier 79 moves the end pieces 22 into telescoping engagement with opposing ends 26 of the beam section 21. After carrier 79 has moved the end pieces 22 fully onto the ends 26 of beam section 21, side clamps 82 and then clamp 83 are sequentially activated, the clamps 82 and 83 adjusting the tubular shape of the end piece 22 to a best-fit shape for engaging the ends 26 of the beam section 21. The welder 73 is then actuated to weld the flanges 24 and 25 and tabs 27–32 in place. The welder 73 can be a robot or other device and is constructed to form welds 92 to weld overlapping flanges 24 and 25 together, and also to weld the attachment tabs 27–32 to the beam section 21. The rotatable bumper holding fixture 64 is rotated periodically during the welding cycle to facilitate welding and so that the welder 73 can most easily weld on all four sides of the end pieces 22 and beam section 21.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A vehicle bumper bar comprising:
    a beam section made from high strength material, the beam section including opposing ends; and
    end pieces attached to each of the opposing ends, each end piece including a body defining a tubular shape configured to mate with the opposing ends, and including overlapping flanges constructed to permit circumferential adjustment so that the tubular shape is adjustable to a best-fit cross-sectional shape by adjusting the overlap of the overlapping flanges before the overlapping flanges are secured to the beam section, and still further including attachment tabs longitudinally engaging the beam section and secured thereto, whereby the end pieces are adjustable circumferentially to better fit the opposing ends of the beam section.

2. The bumper bar defined in claim 1 wherein the beam section includes at least one tubular section.

3. The bumper bar defined in claim 2 wherein the attachment tabs include front, top, rear, and bottom tabs that engage front, top, rear, and bottom surfaces of the beam section.

4. The bumper bar defined in claim 3 wherein the attachment tabs are welded to the beam section.

5. The bumper bar defined in claim 4 wherein the attachment tabs include at least one tab that extends from a rear of the end piece and engages one of the top surface and the bottom surface of the beam section.

6. The bumper bar defined in claim 2 wherein the overlapping flanges are located on a front of the end piece.

7. The bumper bar defined in claim 1 wherein the beam section is rollformed.

8. The bumper bar defined in claim 7 wherein the beam section includes top and bottom walls that are generally planar.

9. The bumper bar defined in claim 8 wherein the beam section has a "B" shaped cross section.

10. The bumper bar defined in claim 9 wherein a rear attachment tab of the end pieces is welded to two spaced-apart portions of a rear surface of the beam section.

11. The bumper bar defined in claim 1 wherein the end pieces each include a rear panel that is generally flat and, when oriented in a vehicle position along with the beam section, define a plane that extends perpendicularly to a fore/aft longitudinal direction of the vehicle.

12. The bumper bar defined in claim 1 wherein the beam section defines a curvilinear front surface.

13. The bumper bar defined in claim 12 wherein the end pieces each include a front surface that defines a compound/increased angle with respect to the front surface of the beam section on the opposing ends.

14. The bumper bar defined in claim 1 wherein the end pieces are each one piece.

15. The bumper bar defined in claim 14 wherein the end pieces are stamped from a single sheet of high strength steel.

16. The bumper bar defined in claim 1 wherein the attachment tabs are flared outwardly to define a slightly opened chute for receiving and telescopingly engaging the opposing ends of the beam section to facilitate assembly thereon.

17. A vehicle bumper bar comprising:
    a beam section made from high strength material, the beam section including opposing ends and further including top, bottom, front, and rear walls forming at least one rigid tube; and
    end pieces attached to each of the opposing ends, each of the end pieces including top, bottom, front, and rear wall sections and including tabs extending from the top, bottom, front, and rear wall sections, the tabs on one of the front and rear wall sections including circumferentially extending tabs that engage and are fixed to at least one of the top and bottom walls on the beam section.

18. The bumper bar defined in claim 17 wherein the tabs include laterally extending tabs that extend from the rear wall section circumferentially into engagement with the front and rear walls of the beam section.

19. The bumper bar defined in claim 17 wherein the end pieces each define a tubular shape, and include overlapping flanges that close the tubular shape, the overlapping flanges being constructed to be slidably adjustable relative to each other until the overlapping flanges are fixed during assembly so that a tubular shape of the end pieces can be adjusted to a best-fit condition on the beam section.

* * * * *